United States Patent [19]
Simpson

[11] 3,867,783
[45] Feb. 25, 1975

[54] QUICK CHANGE FISHING FLOAT
[76] Inventor: Roger J. Simpson, P.O. Box 1078, Merritt Island, Fla. 32952
[22] Filed: Sept. 13, 1973
[21] Appl. No.: 396,693

[52] U.S. Cl. ............................................. 43/44.91
[51] Int. Cl. ............................................ A01k 97/02
[58] Field of Search............ 43/44.91, 44.87, 43.12, 43/44.88

[56] References Cited
UNITED STATES PATENTS

| | | | |
|---|---|---|---|
| 2,137,341 | 11/1938 | Hingle | 43/44.91 |
| 2,570,293 | 10/1951 | Vandnais | 43/44.91 |
| 2,772,509 | 12/1956 | Vandnais | 43/44.91 |
| 2,807,907 | 10/1957 | Brite | 43/44.91 |
| 2,992,508 | 7/1961 | Schmidt | 43/44.91 |
| 3,019,546 | 2/1962 | Hansen | 43/44.91 |
| 3,096,599 | 7/1963 | Baron | 43/44.87 |
| 3,161,982 | 12/1964 | Lee | 43/44.91 |

Primary Examiner—Louis G. Mancene
Assistant Examiner—J. Q. Lever, Jr.
Attorney, Agent, or Firm—Clarence A. O'Brien; Harvey B. Jacobson

[57] ABSTRACT

A buoyant float body having a line receiving axial bore therethrough. A full length radial slot communicates with the axial bore with the inner end of the slot being defined by a second axial bore immediately adjacent to and parallel with the line receiving axial bore. An elongated retaining pin is slidably positioned within the second bore and includes a laterally offset wedge or retaining member which can be selectively inserted into one end of the line receiving bore for a locking of the line therein or, upon a rotation of the pin, seated within a socket freeing the line for slip adjustment of the float therealong.

4 Claims, 6 Drawing Figures

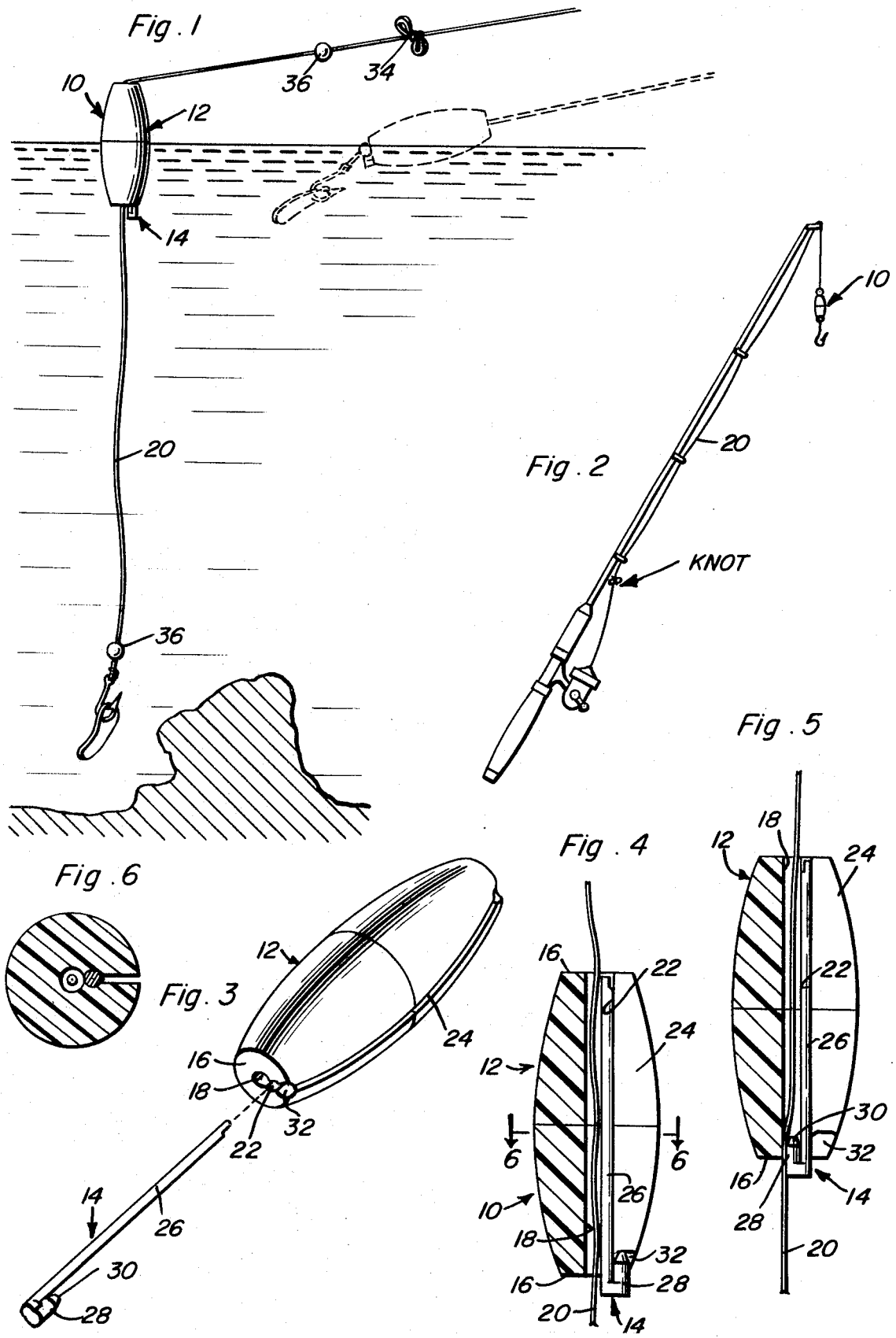

QUICK CHANGE FISHING FLOAT

The present invention relates to new and useful improvements in fishline floats, and is more particularly concerned with the provision of a float which can, through a simple manipulation, be used either as a fixed bobber or as a slip float.

Floats of the type proposed herein are generally known as evidenced by U.S. Pat. No. 2,504,241 wherein the particular advantages of a convertible float have been set forth in detail. Basically, it is the intention of the present invention to provide a uniquely constructed float which converts from a slip float to a fixed position bobber through the simple manipulation of a frictionally secured retaining member with the entire construction, including the float and retaining member, being economically molded of plastic.

Basically, the float includes a line receiving axial bore with a second bore parallel and immediately adjacent to the line receiving bore. A full length radial slot extends through the float body in communication with the bores for a simplified mounting of the float on a line. Once the line is positioned within the line receiving axial bore, an elongated retaining pin is inserted within the second bore where it, through frictional engagement within the bore, remains in any adjusted position. One end of the retaining pin mounts a laterally offset retaining or wedge member which can be alternatively inserted into one end of the line receiving bore for a locking of the line therein, or in a rotationally remote socket whereby the line is free to slide unobstructed through the line receiving bore, thereby providing a slip float.

These together with other objects and advantages which will become subsequently apparent reside in the details of construction and operation as more fully hereinafter described and claimed, reference being had to the accompanying drawings forming a part hereof, wherein like numerals refer to like parts throughout.

FIG. 1 is a view of the float mounted on a line and used in the manner of a slip float;

FIG. 2 is the float positioned preparatory to casting in the manner of a plug;

FIG. 3 is a perspective view of the float body and retaining pin exploded therefrom;

FIG. 4 is a cross-sectional detail through the float illustrating the line freely received through the axial bore;

FIG. 5 is a view similar to FIG. 4 with the retaining member positioned so as to lock the line within the axial bore; and FIG. 6 is a cross-sectional detail taken substantially on a plane passing along line 6—6 in FIG. 4.

Referring now more specifically to the drawings, reference numeral 10 is used to generally designate the float comprising the present invention. This float includes an elongated buoyant plastic float body 12 and a line locking or retaining element 14.

The float body 12, while not necessarily limited thereto, is of an elongated generally cylindrical configuration having tapered end portions terminating in flat ends 16. An elongated line receiving bore or passage 18 is provided axially through the body 12 and of a size so as to allow for a free sliding of the float on the line, herein designated by reference numeral 20.

A second slightly smaller full length element receiving bore 22 is provided parallel and immediately adjacent to the line bore 18. Finally, a mounting slot 24 extends radially outward from the line bore 18 through the bore 22 and to the exterior of the body 12 to allow for a simple mounting of the float on the line 20 by a slipping of the line 20 through the slot 24 and bore 22 into the line receiving axial bore 18.

The retaining element 14 consists of an elongated pin or pin portion 26 snugly although slidably received within the bore 22 with the frictional engagement of the pin 26 within the bore 22 being such so as to effect a retention of the element 14 in any manually adjusted position.

The following end of the pin 26 is provided with a laterally offset projection 28 paralleling the pin 26 for a short distance and terminating in a tapered leading end 30. This projection 28, noting FIG. 5 in particular, is of a size so as to be snugly received or wedged within one end, preferably the inlet end, of the axial line receiving bore 18 in a manner so as to lock the line 20 to the bore wall and effect a locked positioning of the float 10 on the line 20. The tapered leading end or tip 30 of the wedging projection facilitates an introduction thereof into the axial bore 18 and a gradual engagement with the line and bore wall.

FIG. 4 illustrates the retaining member or projection 28 in its stored position turned approximately 180° from the axial bore 18 and moved upwardly into a stored position within an enlarged socket 32 provided in the end portion of the float body 12, preferably directly within an enlarged portion of the radial slot 24. In this position, the float is freely slidable on the line 20 in the manner of a conventional slip float. It will be appreciated that the frictional engagement of the pin or pin portion 26 of the element 14 is such so as to positively retain the element 14 in either adjusted position as illustrated in FIGS. 4 and 5.

In using the invention as a slip float, a knot 34 will be tied in the line at the desired fishing depth, the line normally mounting a sliding bead 36 both above and below the float 10 with the beads engaging respectively against the knot and leader so as to provide an abutment for the slip float form. When used as a slip float, the float can be cast in the manner of a plug as suggested in FIG. 2. Further, as suggested in FIG. 1, the float 10, when used as a slip float, enables a reeling in of the bait with the bait being pulled straight up to the surface of the water rather than dragging over underground obstacles.

The converting of the invention from a slip float to a fixed position bobber requires only a slight outward pulling of the retaining element 14 and a rotating of the element so as to remove the wedging projection 28 from the storage socket 32, after which the pin is moved inwardly with the projection 28 seating in the axial line bore 18 remote from the socket 32. If so desired, a storage socket 32 can be provided at both ends of the float body 12 thus enabling use of the float orientated with either end constituting the line inlet end.

From the foregoing, it should be appreciated that a highly unique convertible or quick change fishing float has been defined. This float, constructed entirely of plastic, is unique in its structural simplicity and manner of use in effecting a selective locking of the float to the line or a release of the line for free movement of the float thereon.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A float comprising a buoyant body, a line passage through said body for free sliding movement of the float on a passage received line, a line retaining member selectively received within one end of said line passage in wedged relation to said line passage and a passage received line to preclude movement of the float relative to a passage received line, a pin bore within said body parallel and adjacent to said line passage, and an elongated pin slidably and rotatably received within said pin passage, said line retaining member comprising a lateral projection on said pin selectively insertable within said one end of the line passage upon a rotation of the pin to align the projection with said one end of the line passage and an inward sliding of the pin into the pin passage and the projection into said one end.

2. The float of claim 1 including a storage socket within said float remote from said line passage for selective reception of said retaining member whereby the line passage is opened for free sliding movement of a received line therethrough.

3. The float of claim 2 including a radial slot extending outwardly from said line passage through said pin bore to the exterior of the float body for introduction of a line therethrough into said line passage.

4. A float comprising a buoyant body, a line passage through said body for free sliding movement of the float on a passage received line, a line retaining member selectively received within one end of said line passage in wedged relation to said line passage and a passage received line to preclude movement of the float relative to a passage received line, and a storage socket within said float remote from said line passage for selective reception of said retaining member whereby the line passage is opened for free sliding movement of a received line therethrough.

* * * * *